United States Patent [19]

Shibahata et al.

[11] Patent Number: 4,744,586
[45] Date of Patent: May 17, 1988

[54] WISHBONE SUSPENSION FOR AUTOMOTIVE VEHICLE

[75] Inventors: Yasuji Shibahata, Yokohama; Hiroshi Tonomura; Yasumasa Tsubota, both of Yokosuka, all of Japan

[73] Assignee: Nissan Motor Co., Ltd., Yokohama, Japan

[21] Appl. No.: 944,169

[22] Filed: Dec. 22, 1986

[30] Foreign Application Priority Data

Dec. 24, 1985 [JP] Japan .................. 60-289327

[51] Int. Cl.$^4$ ............................. B60G 3/20
[52] U.S. Cl. ................. 280/661; 280/689; 280/691
[58] Field of Search ............... 280/661, 690, 698, 699, 280/700, 701, 726, 675, 660, 673, 693–696

[56] References Cited

U.S. PATENT DOCUMENTS 4,440,419 4/1984 Kosak et al. .................. 280/661
4,440,420 4/1984 Muller .......................... 280/661
4,457,537 7/1984 Ohe ............................. 280/661

FOREIGN PATENT DOCUMENTS 1938850 6/1981 Fed. Rep. of Germany .
55-1556 1/1980 Japan .

Primary Examiner—Richard A. Bertsch
Attorney, Agent, or Firm—Foley & Lardner, Schwartz, Jeffery, Schwaab, Mack, Blumenthal & Evans

[57] ABSTRACT

A lower arm and upper links of a double wishbone type suspension are arranged so that the resulting king pin axis about which a road wheel is pivotal, intersects the wheel rotational axis at or close to the wheel center so as to selectively minimize, neutralize or reverse the toe-out effect produced by a force which acts through the wheel center in the aft direction of the vehicle. The lateral rod which controls the orientation of the road wheel is arranged at a predetermined angle to control the amount of toe-in induced by the application of the above mentioned force and a force which acts laterally inboard along the wheel rotational axis.

6 Claims, 3 Drawing Sheets

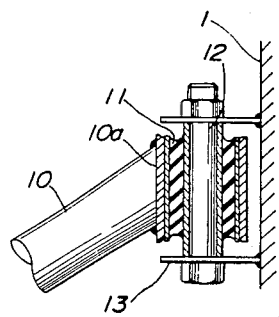
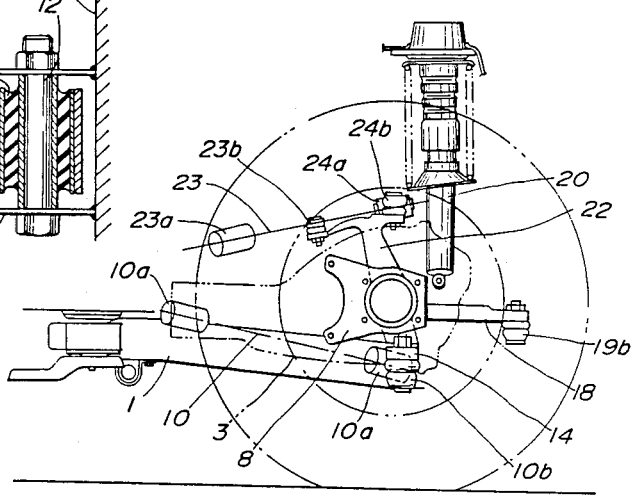
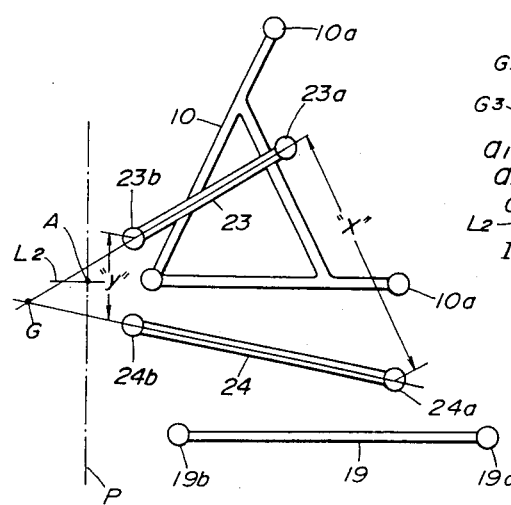
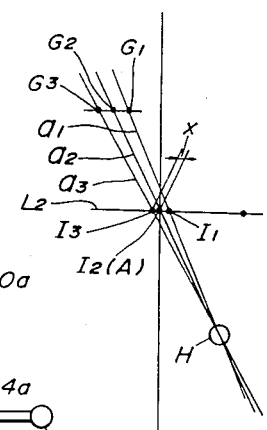

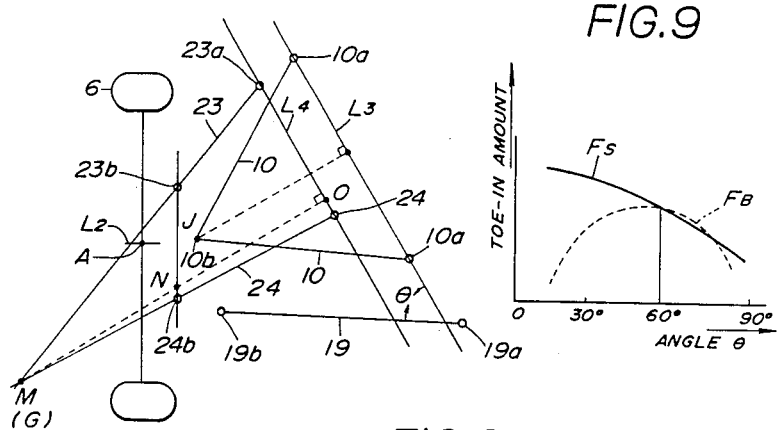
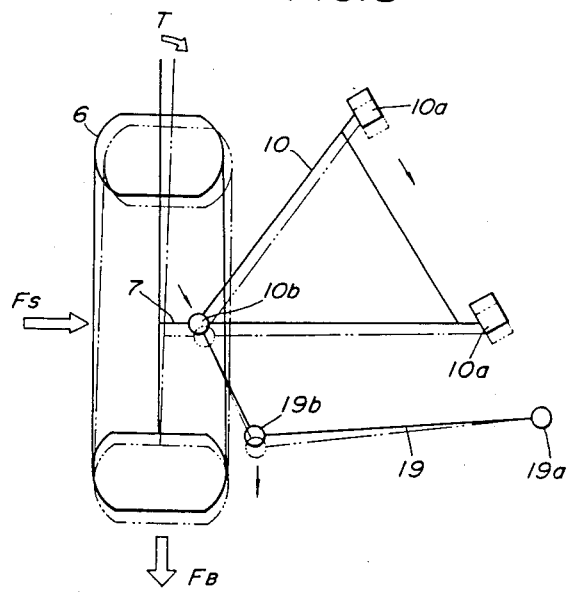

WISHBONE SUSPENSION FOR AUTOMOTIVE VEHICLE

BACKGROUND OF THE INVENTION

1. Field of the Invention

The present invention relates generally to a rear suspension for an automotive vehicle and more specifically to a wishbone type suspension which is so configured as to minimize the amount of toe-out which is produced under given modes of operation such as engine braking and/or permit a toe-in effect to be produced.

2. Description of the Prior Art

Japanese Utility Model First Provisional Publication No. 55-1556 published on Jan. 8, 1980 discloses a rear suspension comprising an essentially A-shaped single lower arm which is pivotally connected at its inboard end to the vehicle chassis and which has a pivot at its outboard end. A road wheel is "steerably" mounted on this pivot. The orientation of the wheel is controlled by a control rod and knuckle arm arrangement. A shock absorber strut interconnects the outboard end of the lower arm with the vehicle chassis.

However, this arrangement has suffered from the drawback that when the road wheel is subject to a force acting laterally inward toward the vehicle a relatively large toe-in is induced while in the case of a force which act toward the rear of the vehicle a notably smaller toe-in is induced.

This phenomenon is deemed to be caused by the fact that the intersection of the axis of the axle and the "king pin axis" which passes through the pivot which interconnects the suspension arm with the shock absorber strut and extends along essentially coincidentally with the axis of the strut, is notably offset from the wheel center. Thus when a force which acts in the aft direction of the vehicle is applied to the road wheel, a moment of force is generated which tends to produce toe-out and which exerts a de-stablizing effect on the suspension characteristics.

SUMMARY OF THE INVENTION

It is an object of the present invention to provide a suspension which is so arrnaged that it is possible to selectively design the suspension so that (a) a desired small amount of toe-out can be produced, (b) zero toe-out produced or (c) even effect reversed and a controlled amount of toe-in induced.

In brief, the above object is achieved by an arrangement wherein a lower arm and upper links of a double wishbone type of suspension are arranged so that the resulting king pin axis about which a road wheel is pivotal, intersects the wheel rotational axis at or close to the wheel center so as to selectively minimize, neutralize or reverse the toe-out effect produced by a force which acts through the wheel center in the aft direction of the vehicle. The lateral rod which controls the orientation of the road wheel is arranged at a predetermined angle with respect to the axis about which the inboard end of the lower arm is pivotal to control the amount of toe-in induced by the application of the above mentioned force and/or a force which acts laterally inboard along the wheel rotational axis.

More specifically, the present invention takes the form of a suspension for a wheeled vehicle having a chassis and a road wheel, the road wheel having an axis of rotation and a center of rotation while lies on the axis, the suspension being characterized by: a structural member which rotatably supports the road wheel; a first suspension arm, the first suspension arm being resiliently connected with the chassis at its inboard end and operatively connected at its outboard end to the structural member via a first joint, the joint being located on the inboard side of a plane which is normal to the axis of rotation and which includes the center of rotation; second and third suspension arms, the second and third suspension arms being resiliently connected at their respective inboard ends to the chassis and connected at their respective outboard ends to the structural member via second and third joints, the second and third suspension arms having axes which converge and intersect at a point which is located outboard of the plane; a king pin axis, the king pin axis passing through the first joint and the point at which the extrapolation of the second and third suspension arms intersect, the king pin axis intersecting the plane at a point close to or coincident with the center of rotation; and a lateral rod, the lateral rod being resiliently connected at its inboard end to the chassis and at its outboard end to the structural member through a fourth joint.

BRIEF DESCRIPTION OF THE DRAWINGS

FIGS. 1, 2 and 3 are plan, front elevation (as seen from the rear of the vehicle) and side elevational views of a first embodiment of the present invention;

FIG. 4 is a partially sectioned view of an elastomeric bush unit via which the suspension arms of the embodiments of the present invention are operatively connected to the vehicle chassis;

FIG. 5 is a schematic plan view showing the arrangement of the suspension members of the present invention and how this arrangement enables the offset of the wheel center and the king pin axis to be reduced to zero;

FIG. 6 is a diagram showing the orientations and the intersections of the axes of the arrangements of three embodiments of the invention;

FIG. 7 is a diagram showing the spacial arrangement of the various joints and axes which characterize the present invention along with the angular orientation of the lateral rod;

FIG. 8 is a schematic diagram showing the forces which act on the road wheel and the corresponding effect of orienting the lateral rod at a predetermined angle with respect to the axes about which the lower A shaped suspension arm is pivotal and FIG. 9 is a graph showing in terms of (a) toe-in amount and (b) the above mentioned angle, the effect on the suspension by a force which acts laterally with respect to the vehicle and one which acts in the aft direction of the same.

DETAILED DESCRIPTION OF THE PREFERRED EMBODIMENTS

Figure 1:
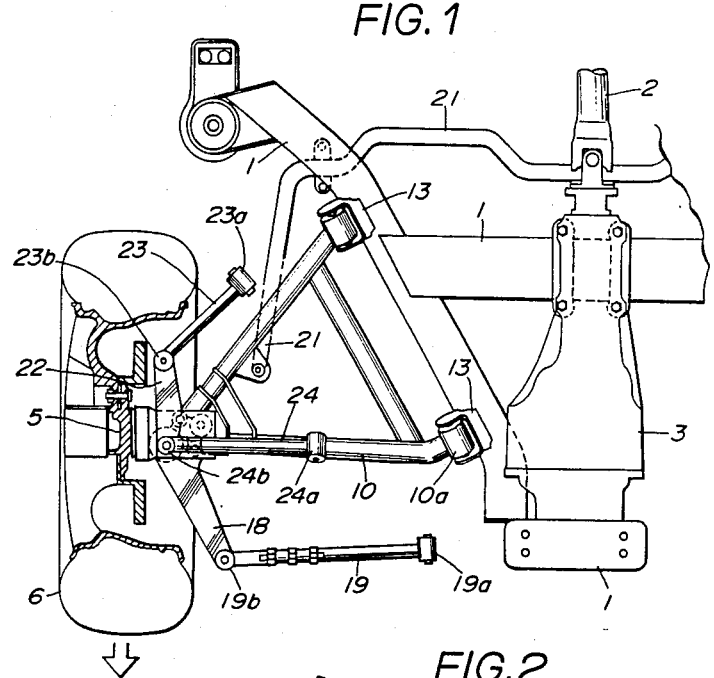
Figure 2:
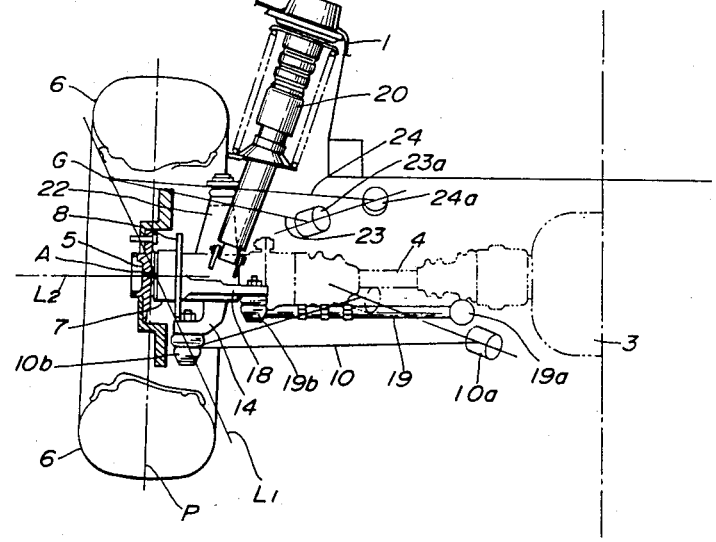

FIGS. 1 to 3 show an embodiment of the present inventin. In this arrangement the numeral 1 denotes the various structural members of a vehicle chassis; 2 a propeller shaft; 3 a differential gear; 4 a rear drive (stub) shaft; 5 a wheel axle; 6 a road wheel mounted on the axle; 7 an axle housing; 8 a brake connection plate formed integrally on or permanently fixed to the axle housing; 10 a lower "A-shaped" wishbone type suspension arm or member; and 10a elastomeric bush units which operatively connect the inboard ends of suspension member 10 to the vehicle chassis 1. As shown in FIG. 4 each of these bush units 10a includes an elastomeric bush 11 through which a shaft in the form of a bolt 12 is disposed and a bracket 13 which is fixedly connected to the chassis 1 of the vehicle.

The outboard end of the lower suspension arm 10 is operatively connected to a bracket 14 fixedly connected to the bottom of the axle housing 7 by way of a ball joint 10b which is enclosed in a dust cover (no numeral).

A lateral rod 19 is connected at its outboard end to a bracket 18 which extends rearwardly from the side of the axle housing 7. The lateral rod 19 has a two piece construction which permits the length of the same to be selectively adjusted. The inboard end of the lateral rod 19 is connected to the vehicle chassis 1 via a bush unit 19a (constructed in a manner essentially the same as that shown in FIG. 4). Connection between bracket 18 and the lateral rod 19 is established by a ball joint 19b.

A McPherson or the like type of shock absorber strut 20 is operatively interconnected between the vehicle chassis 1 and the axle housing 7 in a manner as shown. A torsion bar 21 extends across the vehicle and is connected at each to one of the lower suspension arms 10 (only one end of the bar 21 is shown).

A bracket 22 interconnects the outboard ends of first and second upper link members 23 and 24 with the axle housing 7. As shown, the inboard ends of the links 23 and 24 are connected to the chassis 1 via elastomeric units 23a and 24b respectively. Connection between the bracket 22 and the two links is established by two separate ball joints 23b and 24b. In this instance the elastomeric units 23a and 34a are constructed in a manner essentially as shown in FIG. 4.

As best seen in FIG. 5 the upper links 23 and 24 are arranged to converge in a manner that the span at the inboard ends is "X" while that at the outboard ends is "y" and the extrapolation of the two members intersect at a point "G". This point "G" is located on the outboard side of plane "P" which is normal to the axis of rotation of the road wheel 6 and which includes the wheel center "A". With this configuration the king pin axis L1 is such as pass through point "G" and the center of ball joint 10b in a manner to intersect the wheel center A as shown in FIG. 2.

With this embodiment the amount of toe-out which is induced by a force such as shown in FIG. 1 is reduced essentially to zero.

However, the present invention is not limited to the arrangement wherein the king pin axis intersects the wheel center per se and may be varied in a manner which permits a controlled small amount of toe-out to be induced or, on the other hand, arranged in a manner to produce the reverse effect wherein a controlled amount of toe-in is induced. For example, it is possible to arrange the upper links 23, 24 so that the extrapolations thereof intersect in a location which induces the king pin axis to pass in close proximity of the wheel center A. Viz., as shown in FIG. 1 it is possible to arrange for the intersection of the link extrapolations to intersect at a point $G_1$ so that the king pin axis (denoted by $a_1$) will extend from $G_1$ to H (the center of ball joint 10b) and intersect the wheel rotational axis $L_2$ at a point $I_1$ which is located just inboard of the wheel center A. On the other hand, if the intersection of the extrapolations is arranged to occur at point $G_3$ then the king pin axis ($a_3$) will intersect $L_2$ at point $I_3$ at a location slightly outboard of the wheel center A. This arrangement induces the above mentioned toe-in effect to be induced.

In this diagram king pin axis $a_2$ (which passes through points $G_2$, $a_2$, $I_2$ and H), denotes the arrangement produced by the first embodiment of the present invention which features highly neutral characteristics wherein essentially no toe-out is induced.

With the arrangement of the suspension as described above, as it is possible, as shown in FIG. 7 to arrange for the axes $L_3$ and $L_4$ about which the lower arm 10 and the upper links 23 and 24 are effectively pivotable to be essentially parallel, it is possible to reduce the amount of "roll steer" which is produced during bounding and rebounding of the road wheel 6. Viz., as axes $L_3$ and $L_4$ are essentially parallel, given that the deformation of the bushes is ignored, it is possible to develop (a) a line J - K which extends normally from axis $L_3$ to the center of the ball joint 10b of the lower arm and (b) a line N - O which extends normally from the axis $L_4$ about which the upper links 23 and 24 are effectively pivotal to the intersection of the extrapolations of said links. This enables points defined by elements 23a, 23b, 24a and 24b to lie in the same flat essentially horizontally extending plane. Accordingly, as axes $L_3$, $L_4$ and line J - J and M - O are essentially parallel, during bounding and rebounding, the system defined by points J, K, N and O is prevented from undergoing three-dimensional distortion.

Further, in the above described suspension arrangement the lateral rod 19 is arranged such that an included acute angle $\theta$ is defined between axis $L_3$ and the longitudianl axis of the lateral road 19. The selection of this angle defines an important feature of the present invention. That is to say, the road wheel 6 is subject to not only a force FB, but also a laterally acting force FS which acts along the rotational axis of the road wheel L2.

As shown in FIG. 9 both of these forces have an effect on the amount of toe-in which is produced by the embodiments of the invention arranged as disclosed hereinabove. In the embodiments of the invention this angle is set to approximately 60°. The reason for this is that the amount of toe-in which is induced in response to force FB is essentially equal to that produced by force FB, the effect of force FB drops off rapidly on either side of this value while the effect of force FB steeply increases at more acute angles. It should be noted the values close to 60° (for example in the range of 60° to 75° merely by way of example) can be also used without departing from the scope of the present invention and ensure that the amount of toe-in (see T in FIG. 8) which is induced as a result of the application of forces FS and FB can be stably controlled in a manner which enhances the operational characteristics of the present invention.

What is claimed is:

1. In a suspension for a wheeled vehicle having a chassis and a road wheel, said road wheel having an axis of rotation and a center of rotation which lies on said axis;
   a sructural member which rotatably supports said road wheel;
   a first suspension arm, said first suspension arm being resiliently connected to the chassis at its inboard end and operatively connected at its outboard end of said structural member via a first joint, said joint being located on the inboard side of a plane which is normal to said axis of rotation and which includes said center of rotation;
   second and third suspension arms, said second and third suspension arms being resiliently connected at their respective inboard ends to said chassis and connected at their respective outboard ends to said structural member via second and third joints, said second and third suspension arms having axes which converge and intersect at a point which is located outboard of said plane;

a king pin axis, said king pin axis passing through said first joint and the point at which the extrapolation of said second and third suspension arms intersect, said king pin axis intersecting said plane at a point which is substantially coincident with said center of rotation; and a lateral rod, said lateral rod being resiliently connected at its inboard end to said chassis and at its outboard end to said structural member through a fourth joint.

2. A suspension as claimed in claim 1, wherein said first suspension arm is arranged to be pivotal at its inboard end about a first pivot axis and said lateral rod arranged in a manner that the angle defined between the longitudinal axis of said lateral rod and said first pivot axis.

3. A suspension as claimed in claim 2, wherein said first, second, third and fourth joints take the form of ball joints.

4. A suspension as claimed in claim 2, wherein said angle is selected to be approximately 60°.

5. A suspension as claimed in claim 2, wherein said first pivot axis about which the inboard end of said first suspension arm is pivotal and second pivot axis about which the inboard ends of said second and third suspension arms are effectively pivotal in situ, are essentially parallel and lines which extend normally from said the respective axes to said first joint and the point at which said second and third suspension arms intersect, are essentially parallel.

6. A suspension as claimed in claim 1, wherein said first suspension arm takes the form of a lower A-shaped arm the inboard end of which is connected at two points to said vehicle chassis; said second and third suspension arms take the form of first and second essentially straight links; and said structural member takes the form an axle housing from which a plurality of brackets extend.

* * * * *